(12) United States Patent
Na et al.

(10) Patent No.: US 11,474,690 B2
(45) Date of Patent: Oct. 18, 2022

(54) METHOD, SYSTEM AND NON-TRANSITORY COMPUTER-READABLE RECORDING MEDIUM FOR NON-CONTACT CONTROL

(71) Applicant: VTOUCH CO., LTD., Seoul (KR)

(72) Inventors: Jin Hee Na, Seoul (KR); Seok Joong Kim, Seoul (KR); Jik Han Jung, Yongin-si (KR)

(73) Assignee: VTOUCH CO., LTD., Seoul (KR)

( * ) Notice: Subject to any disclaimer, the term of this patent is extended or adjusted under 35 U.S.C. 154(b) by 0 days.

(21) Appl. No.: 17/372,680

(22) Filed: Jul. 12, 2021

(65) Prior Publication Data
US 2022/0050591 A1 Feb. 17, 2022

(30) Foreign Application Priority Data

Aug. 14, 2020 (KR) .................. 10-2020-0102814
Sep. 21, 2020 (KR) .................. 10-2020-0121843
Nov. 24, 2020 (KR) .................. 10-2020-0158512

(51) Int. Cl.
*G06F 3/04883* (2022.01)
*G06F 3/01* (2006.01)

(52) U.S. Cl.
CPC .......... *G06F 3/04883* (2013.01); *G06F 3/011* (2013.01)

(58) Field of Classification Search
CPC .. G06F 3/04883; G06F 3/011; G06F 3/04845; H04N 13/383; G06T 7/215
See application file for complete search history.

(56) References Cited

U.S. PATENT DOCUMENTS

| 2013/0222233 | A1* | 8/2013 | Park | G06F 3/03 345/156 |
| 2014/0201689 | A1* | 7/2014 | Bedikian | G06F 3/04845 715/863 |
| 2016/0179205 | A1* | 6/2016 | Katz | H04N 13/383 345/156 |
| 2017/0185166 | A1* | 6/2017 | Madmony | G06T 7/215 |
| 2018/0157398 | A1  | 6/2018 | Kaehler et al. | |
| 2019/0018141 | A1* | 1/2019 | Holz | G01S 17/003 |

(Continued)

FOREIGN PATENT DOCUMENTS

| JP | 2004258837 A | 9/2004 |
| JP | 2013030134 A | 2/2013 |
| KR | 20140060604 A | 5/2014 |

(Continued)

*Primary Examiner* — Richard J Hong
(74) *Attorney, Agent, or Firm* — Dinsmore & Shohl LLP

(57) ABSTRACT

A method of assisting an object control comprises determining a first coordinate with reference to, as a trigger coordinate, a coordinate at a time point when a trigger event relating to movement of a control means is generated, among motion coordinates of the control means, determining a second coordinate with reference to at least one of a distance between the trigger coordinate and the motion coordinates, a straight line section specified by the trigger coordinate and the motion coordinates, a distance between the first coordinate and the motion coordinates, and a straight line section specified by the first coordinate and the motion coordinates, and determining a motion vector determined based on the first coordinate and the second coordinate as an instruction vector for determining a control position in a control object region.

13 Claims, 11 Drawing Sheets

(56) References Cited

U.S. PATENT DOCUMENTS

2019/0019515 A1* 1/2019 Kim .................. G06F 3/167
2020/0042170 A1 2/2020 Goulden et al.

FOREIGN PATENT DOCUMENTS

| KR | 20150028181 A | 3/2015 |
| KR | 10-1630153 B | 6/2016 |
| KR | 20200033040 A | 3/2020 |

* cited by examiner

METHOD, SYSTEM AND NON-TRANSITORY COMPUTER-READABLE RECORDING MEDIUM FOR NON-CONTACT CONTROL

CROSS-REFERENCE TO RELATED APPLICATION

This application claims priority to Korean Patent Application No. 10-2020-0102814 filed on Aug. 14, 2020, Korean Patent Application No. 10-2020-0121843 filed on Sep. 21, 2020, and Korean Patent Application No. 10-2020-0158512 filed on Nov. 24, 2020.

This application is filed with the support of Seoul Business Agency (SBA) of Republic of Korea under Artificial intelligence (AI) technology commercialization support project specialized for post-covid in 2020 (Project No.: CY201054; Project name: "Development of recognition technology for control intention of non-contact remote virtual touch panel, which fundamentally prevents contagious infection").

TECHNICAL FIELD

The present disclosure relates to a method, a system, and a non-transitory computer-readable recording medium for assisting object control.

BACKGROUND

Inevitable contact may occur in the course of touching a display, pressing a button, and turning a switch on and off. A user may touch with his/her hand a place to which respiratory droplets sprayed from a person infected with a virus (e.g., COVID-19) adhere. In this case, when the user touches his/her own mucosa or conjunctiva with his/her hand, the user may be infected with the virus.

In particular, they may come into contact with each another via intermediations such as touch displays, buttons, switches, and the like located in a public place where an unspecified number of people is gathered. This increases the risk of infection. Thus, there is a need for a method capable of controlling the intermediations in a non-contact manner.

There exist various non-contact control manners using a proximity sensor, an infrared (IR) touch, a hand gesture, and the like. Unlike a contact control manner capable of specifying an accurate contact position, the non-contact control manner may fail to accurately recognize a region intended by a user. Thus, there is a need for a non-contact control manner to predict a position intended by the user.

As an example, a manner of selecting a coordinate closest to a control object region within a predetermined distance among coordinates may be used. However, when control means such as a fingertip of the user does not approach the control object region in a vertical direction to the control object region, an error between a coordinate intended by the user and a coordinate predicted by a system may occur.

As another example, a manner of connecting two coordinates of body portions of the user (e.g., a coordinate of the wrist and a coordinate of the fingertip) with each other to specify a control position may be used. However, this makes it difficult for the user to intuitively recognize the control position, and thus a visual guide such as a cursor needs to be provided.

As yet another example, a manner of connecting eye(s) and a fingertip of the user to specify a control position may be used. However, a guidance on how to select a position at which the eyes and the fingertip are connected to each other needs to be provided additionally to the user. In particular, there is a possibility that the closer the distance between the user and the control object region, the more often only the fingertip moves. This may result in a larger error.

As yet another example, a manner of performing control when a control means comes close to a control object region within a predetermined distance, may be used. However, in a system in which a trigger is detected when the control means comes close to the control object region within a predetermined distance (e.g., 5 cm), the user is unlikely to accurately recognize a specific position spaced apart from the control object region by the predetermined distance. This makes it difficult for the user to perform a delicate operation. Further, since the trigger may be detected while the user is moving toward the control position, a location that is completely different from the intended position of the user may be selected. In particular, there is a problem in that when the control means is brought closer to the control object region, the accuracy of prediction grows higher, but the risk of contact also grows higher.

Meanwhile, the control operation of the user may be generally classified into (i) motion of moving a fingertip toward a control position, and (ii) motion of touching a control object region with the fingertip so as to perform control.

In this case, the motion (i) of moving the fingertip toward the control position may vary depending on a position of the user, a position of the user's hand before the control, or the like. For example, when the user is on the side of the control object region or when the user needs to lift up his/her hand to perform the control, the motion (i) of moving the fingertip toward the control position and the motion (ii) of touching the control object region with the fingertip are different in direction from each other so that the motions may be regarded as distinct operations. That is, when the directions of the motion (i) of moving the fingertip toward the control position and the motion (ii) of touching the control object region with the fingertip are different from each other, it becomes difficult to predict the final control position through the motion (i) of moving the fingertip toward the control position. In this case, the control position may be predicted based on the position of the fingertip at the time the motion (i) ends.

In addition, when the user performs control while being in front of the control object region, the directions of the motion (i) of moving the fingertip toward the control position and the motion (ii) of touching the control object region with the fingertip are similar to each other, and these motions may be performed in a consecutive order. That is, when the directions of the motion (i) of moving the fingertip toward the control position and the motion (ii) of touching the control object region with the fingertip are similar to each other, the final control position may be predicted based on the motion (i) of moving the fingertip toward the control position.

In short, the control operation is classified into the motion (i) of moving the fingertip toward the control position and the motion (ii) of touching the control object region with the fingertip. In case that the motion (i) and the motion (ii) are performed in a consecutive order, the control position is predicted based on the motions. In case that the motion (i) and the motion (ii) are distinguished from each other, the control position is predicted based on the position of the fingertip after the motion (i). Therefore, it is possible to more accurately predict the control position intended by the user.

On the other hand, by determining a control intention and a control position with reference to a time point when the user stops the control means, the user can control with a recognition of his/her own control time point. In particular, when the motion (i) and the motion (ii) are performed in a consecutive order, it becomes possible to accurately predict the control position even at a position farther away from the control object region.

Based on the above findings, the inventors present a novel and improved technique which is capable of accurately specifying a control position that accords with the intention of a user in a control object region by specifying a motion vector based on a first coordinate determined with reference to, as a trigger coordinate, a coordinate at a time point when a trigger event relating to movement of a control means is generated among the motion coordinates of the control means, and a second coordinate determined with reference to a distance and straight line section specified based on the first coordinate or the trigger coordinate, and using the specified motion vector.

SUMMARY

One object of the present disclosure is to solve all the above-described problems.

Another object of the present disclosure is to accurately predict a control position that accords with the intention of a user in a control object region.

Yet another object of the present disclosure is to minimize occurrence of error by verifying validity of a motion vector for specifying a control position.

Still another object of the present disclosure is to specify a control position intended by a user by dynamically determining a control position calculation manner having a relatively high accuracy among a plurality of control position calculation manners.

Representative configurations of the present disclosure to achieve the above objects are described below.

According to one aspect of the present disclosure, there is provided a method of assisting an object control, comprising the steps of: determining a first coordinate with reference to, as a trigger coordinate, a coordinate at a time point when a trigger event relating to movement of a control means is generated, among motion coordinates of the control means; determining a second coordinate with reference to at least one of a distance between the trigger coordinate and the motion coordinates, a straight line section specified by the trigger coordinate and the motion coordinates, a distance between the first coordinate and the motion coordinates, and a straight line section specified by the first coordinate and the motion coordinates; and determining a motion vector determined based on the first coordinate and the second coordinate as an instruction vector for determining a control position in a control object region.

Further, according to another aspect of the present disclosure, there is provided a system for assisting an object control, comprising: a coordinate management unit configured to determine a first coordinate with reference to, as a trigger coordinate, a coordinate at a time point when a trigger event relating to movement of a control means is generated, among motion coordinates of the control means, and configured to determine a second coordinate with reference to at least one of a distance between the trigger coordinate and the motion coordinates, a straight line section specified by the trigger coordinate and the motion coordinates, a distance between the first coordinate and the motion coordinates, and a straight line section specified by the first coordinate and the motion coordinates; and an instruction vector management unit configured to determine a motion vector determined based on the first coordinate and the second coordinate as an instruction vector for determining a control position in a control object region.

In addition, there are further provided other methods and systems to implement the present disclosure, as well as non-transitory computer-readable recording media having stored thereon computer programs for executing the methods.

According to the present disclosure, it is possible to accurately predict a control position that accords with the intention of a user in a control object region.

Further, according to the present disclosure, it is possible to minimize occurrence of error by verifying validity of a motion vector for specifying the control position.

Furthermore, according to the present disclosure, it is possible to specify a control position intended by a user by dynamically determining a control position calculation manner having a relatively high accuracy among a plurality of control position calculation manners.

DETAILED DESCRIPTION

Figure 1:
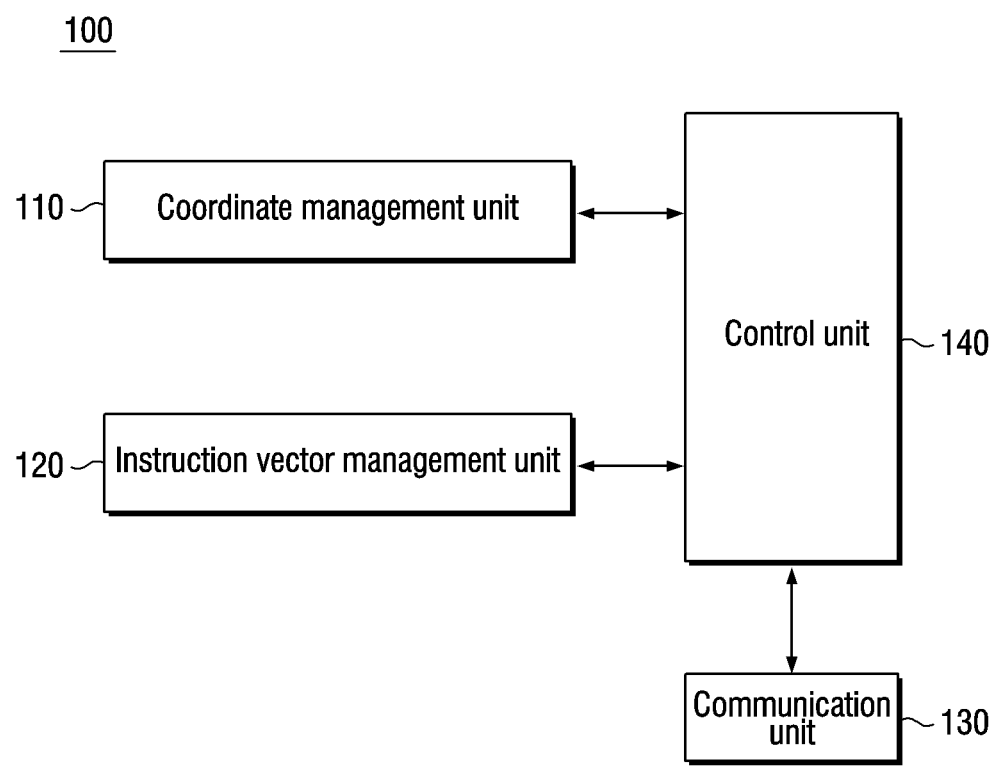
FIG. 1 illustratively shows an internal configuration of an object control assistance system according to one embodiment of the present disclosure.

In the following detailed description of the present disclosure, references are made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different from each other, are not necessarily mutually exclusive. For example, specific shapes, structures and characteristics described herein may be implemented as modified from one embodiment to another without departing from the spirit and scope of the present disclosure. Furthermore, it shall be understood that the positions or arrangements of individual elements within each of the embodiments may also be modified without departing from the spirit and scope of the present disclosure. Therefore, the following detailed description is not to be taken in a limiting sense, and the scope of the present disclosure is to be taken as encompassing the scope of the appended claims and all equivalents thereof. In the drawings, like reference numerals refer to the same or similar elements throughout the several views.

Hereinafter, various preferred embodiments of the present disclosure will be described in detail with reference to the accompanying drawings to enable those skilled in the art to easily implement the present disclosure.

Configuration of Object Control Assistance System

An internal configuration of an object control assistance system 100 crucial for implementing the present disclosure and functions of respective components thereof will be described.

FIG. 1 illustratively shows an internal configuration of the object control assistance system 100 according to one embodiment of the present disclosure.

Referring to FIG. 1, the object control assistance system 100 according to one embodiment of the present disclosure may include a coordinate management unit 110, an instruction vector management unit 120, a communication unit 130, and a control unit 140. Further, according to one embodiment of the present disclosure, at least some of the coordinate management unit 110, the instruction vector management unit 120, the communication unit 130, and the control unit 140 may be program modules to communicate with an external system (not shown). Such program modules may be included in the object control assistance system 100 in the form of operating systems, application program modules, and other program modules, while they may be physically stored in a variety of commonly known storage devices. Further, the program modules may also be stored in a remote storage device that may communicate with the object control assistance system 100. Meanwhile, such program modules may include, but not limited to, routines, subroutines, programs, objects, components, data structures, and the like for performing specific tasks or executing specific abstract data types as will be described below according to the present disclosure.

Although the object control assistance system 100 is described as above, such a description is an example. As will be understood by those skilled in the art, at least some of the components or functions of the object control assistance system 100 may be implemented inside or included in a device (to be described below) as needed. In addition, in some cases, all functions and all components of the object control assistance system 100 may be executed entirely inside the device or may be included entirely in the device.

The device according to one embodiment of the present disclosure is a digital device having a memory means and a microprocessor for computing capabilities, and may include a wearable device such as smart glasses, a smart watch, a smart band, a smart ring, a smart necklace, a smart earset, a smart earphone, a smart earring, or the like, or a somewhat traditional device such as a smart phone, a smart pad, a desktop computer, a server, a notebook computer, a workstation, a personal digital assistant (PDA), a web pad, a mobile phone, a remote controller, or the like. The device may be changed in various forms at such a level that can achieve the objects of the present disclosure as well as the foregoing examples. Further, the device according to one embodiment of the present disclosure may include a camera module (not shown) for capturing an image of a control means (e.g., a pointer held by a user, eyes or fingertip of the user, etc.), or may be in communication with the camera module or other device provided with the camera module via a known communication network.

Further, the aforementioned device according to one embodiment of the present disclosure may include an application for assisting an object control according to the present disclosure. Such an application may be downloaded from an external distribution server (not shown). Further, features of the program modules may be generally similar to those of the coordinate management unit 110, the instruction vector management unit 120, the communication unit 130, and the control unit 140 of the object control assistance system 100, which will be described below. Here, at least a portion of the application may be replaced with a hardware device or a firmware device that may perform a substantially equal or equivalent function, as necessary.

The coordinate management unit 110 according to one embodiment of the present disclosure may perform a function of determining a first coordinate with reference to, as a trigger coordinate, a coordinate at a time point when a trigger event relating to movement of the control means is generated among motion coordinates of the control means. The trigger event relating to the movement of the control means according to one embodiment of the present disclosure may include changing a direction of the movement of the control means, stopping the movement of the control means, and the like. More specifically, the trigger event may include an event in which the control means moves forward and then moves backward, or an event in which the control means moves forward and then stops. Directions of the movements such as the forward movement and the backward movement may be specified with reference to a control object region.

As an example, the coordinate management unit 110 may determine, as the first coordinate, a coordinate (i.e., the trigger coordinate) at a time point when a trigger event in which the control means moves toward the control object region and then stops is generated among the motion coordinates of the control means.

As another example, when a trigger event in which the control means moves toward the control object region and then moves backward is generated, the coordinate management unit 110 may determine, as the first coordinate, a motion coordinate of the control means at a predetermined previous time point (e.g., a time point just before the generation of the trigger event) with reference to a motion coordinate of the control means at a time point when the respective trigger event is generated, namely a trigger coordinate. The predetermined previous time point referred to herein may be specified based on a capturing interval or a frame rate of a capturing module (e.g., a camera) that captures an image of the control means.

At the time point when the trigger event is generated, the control means may shake. In order to correct such a shake, the coordinate management unit 110 may determine the first coordinate with reference to at least one motion coordinate of the control means specified based on the trigger coordinate.

As an example, the coordinate management unit 110 may determine the first coordinate by statistically analyzing a plurality of motion coordinates of the control means specified for a predetermined period of time with reference to the time point when the trigger coordinate is specified. The statistical analysis according to one embodiment of the present disclosure may include analysis based on an average, weighted average, variance, standard deviation, and the like of the plurality of motion coordinates. More specifically, the coordinate management unit 110 may determine, as the first coordinate, a motion coordinate obtained by averaging the plurality of motion coordinates specified for 0.01 seconds to 0.1 seconds with reference to the time point when the trigger coordinate is specified.

As another example, the coordinate management unit 110 may determine the first coordinate by statistically analyzing the plurality of motion coordinates of the control means which exist within a predetermined distance from the trigger coordinate. More specifically, the coordinate management unit 110 may determine, as the first coordinate, a motion coordinate obtained by averaging the plurality of motion coordinates of the control means specified within a distance of 5 mm to 10 mm from the trigger coordinate.

In some embodiments, the coordinate management unit 110 may exclude at least one of the trigger coordinate described above and the motion coordinates within the predetermined distance from the trigger coordinate, from the subject of the statistical analysis.

As an example, when a trigger event in which the control means moves forward and then stops or moves forward and then moves backward is generated, a trigger coordinate specified with reference to a time point when the trigger event is generated, and a motion coordinate within a distance of 5 mm from the trigger coordinate may greatly shake. For this reason, the coordinate management unit 110 may exclude the trigger coordinate and the motion coordinate within the distance of 5 mm from the trigger coordinate, from the subject of the statistical analysis.

In some embodiments, the coordinate management unit 110 may determine a second coordinate with reference to a distance between the trigger coordinate or the first coordinate and the motion coordinates of the control means.

Figure 2:
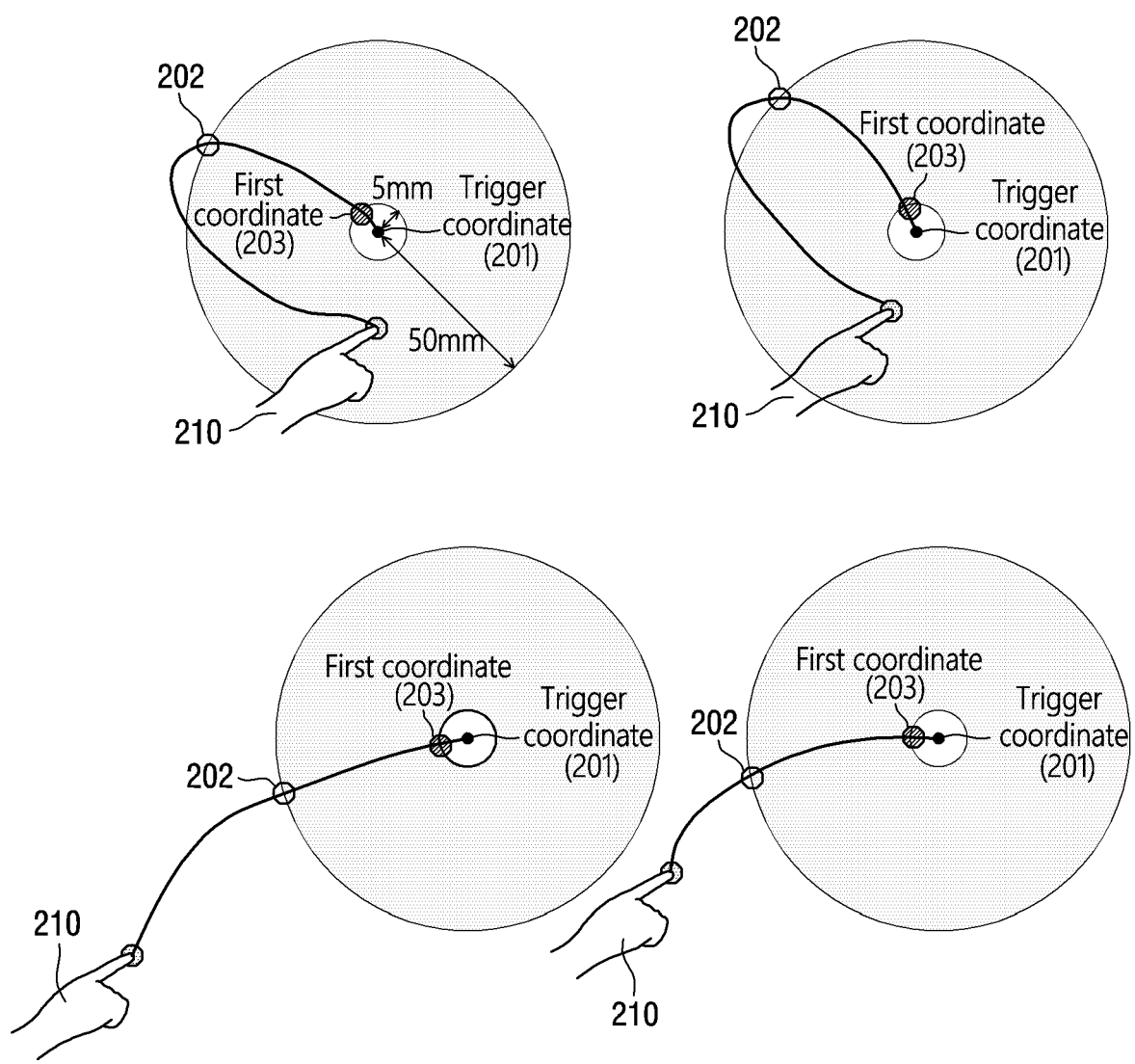
FIG. 2 illustratively shows a process of assisting object control to a user, according to one embodiment of the present disclosure.

As an example, the coordinate management unit 110 may determine, as the second coordinate, a motion coordinate of the control means at a time point when the distance between the trigger coordinate or the first coordinate and the motion coordinates of the control means becomes equal to or greater than a predetermined level. More specifically, as shown in FIG. 2, the coordinate management unit 110 may determine, as the second coordinate, a motion coordinate 202 of the control means at a time point when a distance between a trigger coordinate 201 and the motion coordinates of the control means is equal to or greater than 40 mm to 50 mm.

As another example, the coordinate management unit 110 may determine, as the second coordinate, a motion coordinate at a time point closest to the time point when the first coordinate is specified, among the motion coordinates of the control means having a distance of equal to or greater than a predetermined level from the trigger coordinate. More specifically, as shown in FIG. 2, the coordinate management unit 110 may determine, as the second coordinate, the motion coordinate 202 at a time point closest to a time point when a first coordinate 203 is specified among the motion coordinates of the control means having the distance of equal to or greater than 50 mm from the trigger coordinate 201.

In some embodiments, the coordinate management unit 110 may determine the second coordinate with reference to a straight line section specified by the trigger coordinate or the first coordinate and the motion coordinates of the control means.

As an example, the coordinate management unit 110 may determine, as the second coordinate, a motion coordinate existing at the farthest distance from the first coordinate (or the trigger coordinate) among the motion coordinates in a straight line section specified by connecting each of the motion coordinates of the control means at other time points, which are temporally adjacent to the time point when the first coordinate (or the trigger coordinate) is specified, with the first coordinate (or the trigger coordinate). In this case, when all the temporally-adjacent motion coordinates from the time point when the first coordinate (or the trigger coordinate) is specified to the above other time points, exist within a predetermined distance from the straight lines connecting the first coordinate (or the trigger coordinate) and the motion coordinates of the control means at the above other time points, the straight line sections may be specified.

More specifically, it is assumed that the time point when the first coordinate (or the trigger coordinate) is specified is a first time point, a motion coordinate of the control means at a second time point temporally adjacent to the first time point is a second motion coordinate, a motion coordinate of the control means at a third time point temporally adjacent to the second time point is a third motion coordinate, and a motion coordinate of the control means at a fourth time point temporally adjacent to the third time point is a fourth motion coordinate. In this case, when the second motion coordinate exists within a predetermined distance from a straight line which connects the first coordinate (or the trigger coordinate) and the third motion coordinate, the coordinate management unit 110 may specify the straight line section to consist of the first coordinate (or the trigger coordinate), the second motion coordinate and the third motion coordinate. Further, when both the second motion coordinate and the third motion coordinate exist within a predetermined distance from a straight line connecting the first coordinate (or the trigger coordinate) and the fourth motion coordinate, the coordinate management unit 110 may specify the straight line section to consist of the first coordinate (or the trigger coordinate), the second motion coordinate, the third motion coordinate and the fourth motion coordinate.

In some embodiments, the coordinate management unit 110 may specify the longest one among straight line sections that can be specified by connecting the motion coordinates of the control means at other time points, which are temporally adjacent to the time point when the first coordinate (or the trigger coordinate) is specified, with each other in a temporally-adjacent order, and may determine, as the second coordinate, a motion coordinate located at the farthest distance from the first coordinate (or the trigger coordinate) among the plurality of motion coordinates of the control means which exist in the longest straight line section. In some embodiments, distances between the plurality of motion coordinates of the control means which exist in the straight line section may fall within a predetermined range.

Figure 3:
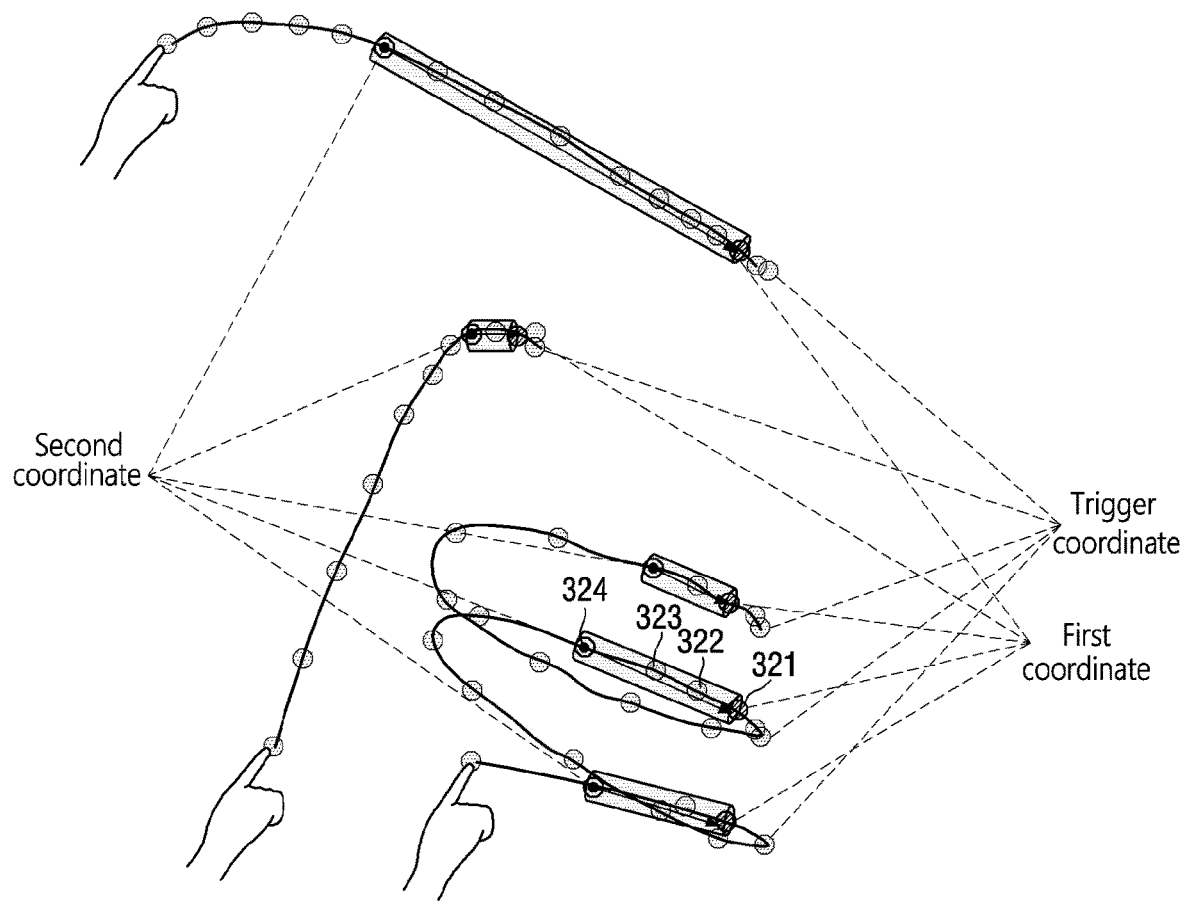
FIG. 3 illustratively shows a process of assisting object control to a user, according to one embodiment of the present disclosure.

Further, as shown in FIG. 3, it is assumed that a time point when a first coordinate 321 is specified is a first time point, a motion coordinate of the control means at a second time point temporally adjacent to the first time point is a second motion coordinate 322, a motion coordinate of the control means at a third time point temporally adjacent to the second time point is a third motion coordinate 323, and a motion coordinate of the control means at a fourth time point temporally adjacent to the third time point is a fourth motion coordinate 324. In this case, the coordinate management unit 110 may determine, as specifiable straight line sections, a first straight line section which connects the first coordinate 321 and the second motion coordinate 322, a second straight line section which connects the first coordinate 321 and the third motion coordinate 323, and a third straight line section which connects the first coordinate 321 and the fourth motion coordinate 324, and may determine, as the second coordinate, the fourth motion coordinate 324 existing at the farthest distance from the first coordinate 321 among the plurality of motion coordinates in the third straight line section, which is the longest one among the plurality of specifiable straight line sections (i.e., the first straight line section, the second straight line section, and the third straight line section).

In some embodiments, the coordinate management unit 110 may determine, as the second coordinate, one closest to the first coordinate (or the trigger coordinate) among a coordinate determined with reference to a distance between the first coordinate (or the trigger coordinate) and motion coordinates of the control means, and a coordinate determined with reference to a straight line section specified by the first coordinate (or the trigger coordinate) and the motion coordinates of the control means.

Figure 4:
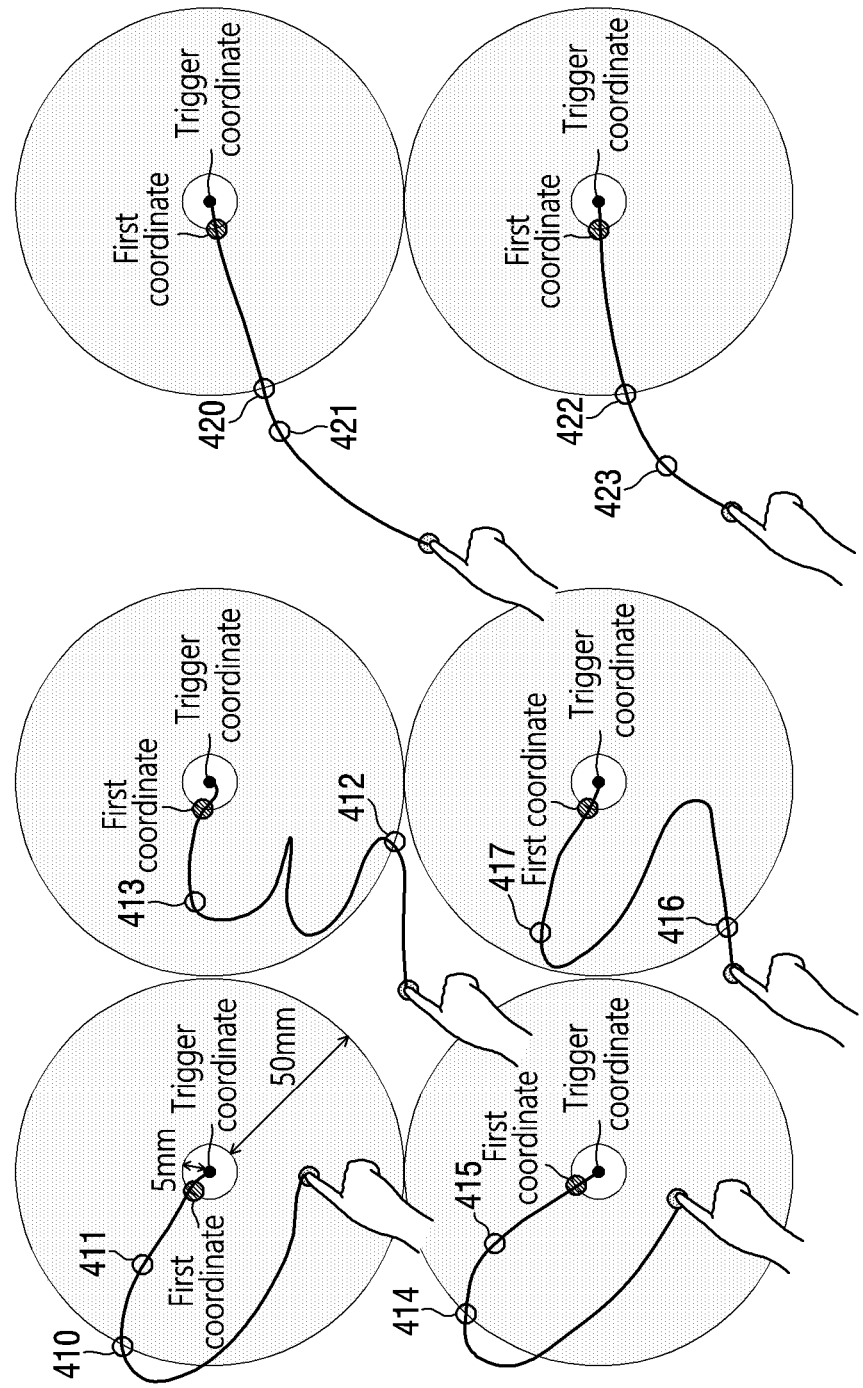
FIG. 4 illustratively shows a process of assisting object control to a user, according to one embodiment of the present disclosure.

As an example, as shown in FIG. 4, the coordinate management unit 110 may determine, (i) motion coordinates 410, 412, 414, 416, 420, and 422 of the control means at a time point when a distance between the trigger coordinate and the motion coordinates of the control means becomes equal to or greater than a predetermined level, and (ii) motion coordinates 411, 413, 415, 417, 421, and 423 existing at the farthest distance from the first coordinate among motion coordinates in a straight line section that can be specified by connecting each of the motion coordinates of the control means at other time points temporally adjacent to the time point when the first coordinate is specified with the first coordinate described above, and may determine, as the second coordinate, the motion coordinates 411, 413, 415, 417, 420, and 422 closest to the first coordinate among the plurality of motion coordinates 410, 411, 412, 413, 414, 415, 416, 417, 420, 421, 422, and 423.

The instruction vector management unit 120 may determine a motion vector determined based on the first coordinate and the second coordinate as an instruction vector for determining a control position in a control object region. The control object region according to one embodiment of the present disclosure may mean a region on which at least one object controllable by a user is displayed.

As an example, the instruction vector management unit 120 may determine, as the instruction vector for determining the control position in the control object region, a motion vector having the aforementioned second coordinate as a start point and the aforementioned first coordinate as an end point.

In some embodiments, when there is no motion coordinate where a distance between the trigger coordinate or the first coordinate and the motion coordinates of the control means is equal to or greater than a predetermined level, the instruction vector management unit 120 may determine that there is no specifiable motion coordinate.

Figure 5:
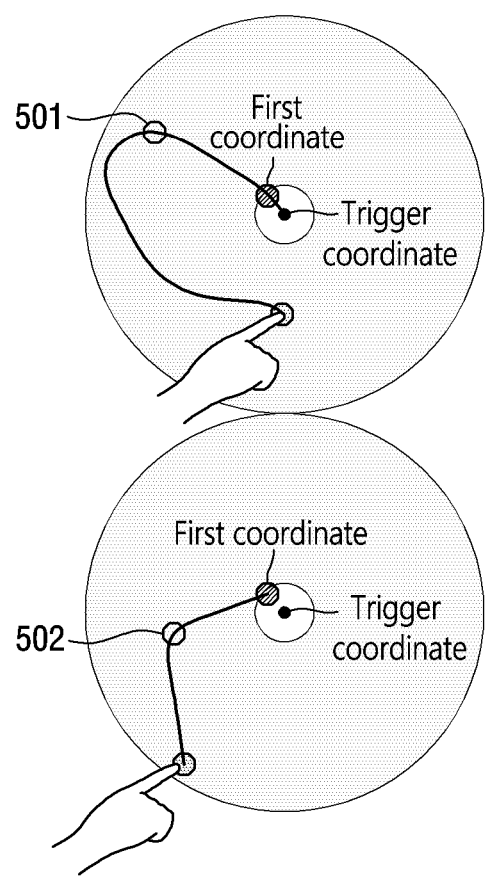
FIG. 5 illustratively shows a process of assisting object control to a user, according to one embodiment of the present disclosure.

As an example, as shown in FIG. 5, even if second coordinates 501 and 502, which are determined with reference to a straight line section specified by the trigger coordinate or the first coordinate and the motion coordinates of the control means, can be specified, when second coordinates, which are determined with reference to a distance between the trigger coordinate or the first coordinate and the motion coordinates of the control means, cannot be specified, the instruction vector management unit 120 may determine that there is no specifiable motion coordinate.

In some embodiments, the instruction vector management unit 120 may verify the validity of the motion vector with reference to at least one of a length, speed, direction of the motion vector, and a position of the first coordinate.

As an example, when a length obtained by scaling the length of the motion vector by a predetermined factor is larger than a distance between the control object region and the first coordinate, the instruction vector management unit 120 may determine the motion vector to be valid.

Figure 6:
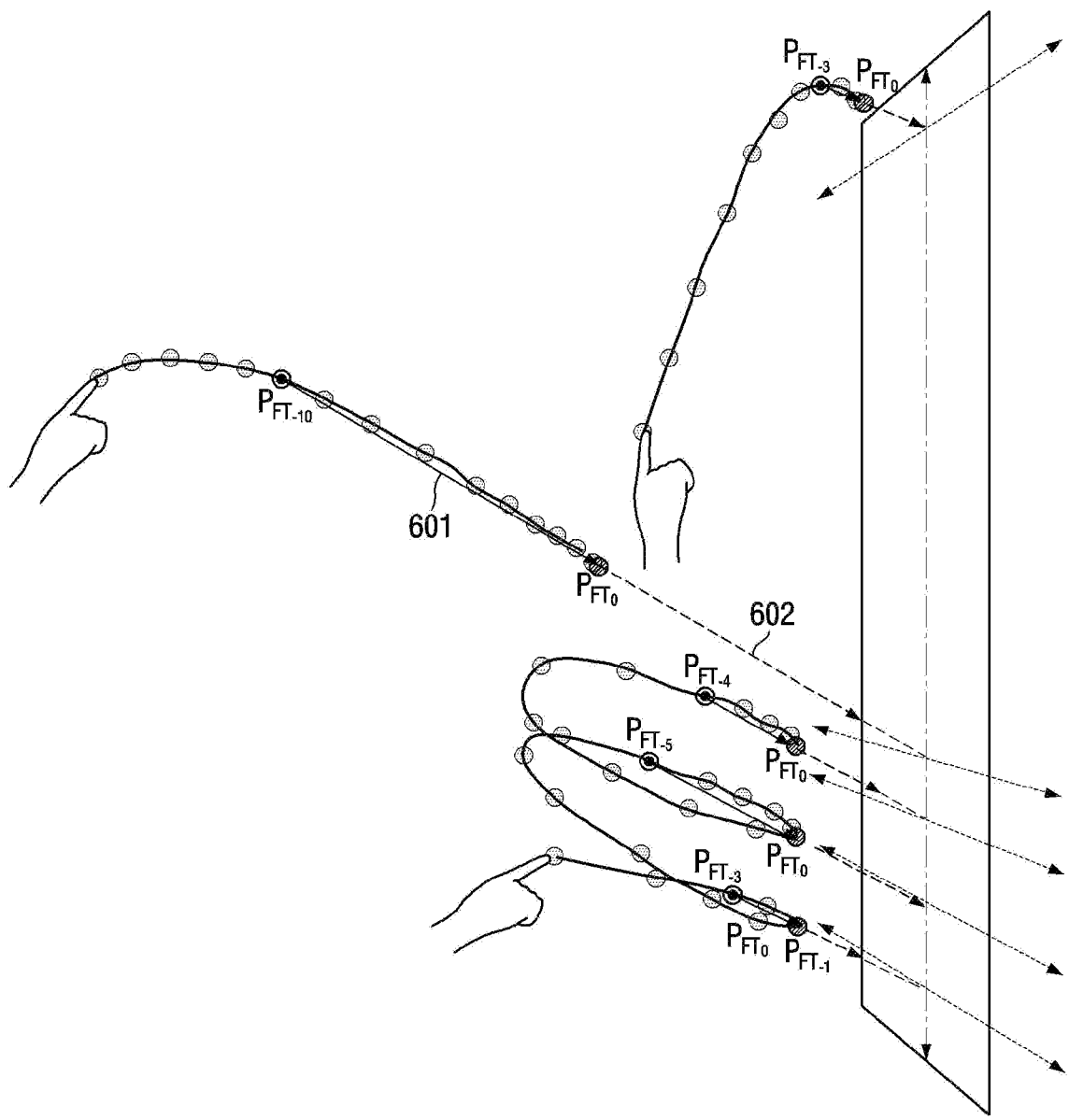
FIG. 6 illustratively shows a process of assisting object control to a user, according to one embodiment of the present disclosure.

As another example, the instruction vector management unit 120 may specify a valid region based on the length of the motion vector, and determine the motion vector to be valid when the control object region exists within the valid region. More specifically, as shown in FIG. 6, the instruction vector management unit 120 may specify a region (or an extended region) obtained by scaling the length of the motion vector by a predetermined level as a valid region 602, and determine the motion vector to be valid when there exists a region common to the valid region 602 and the control object region.

As yet another example, the instruction vector management unit 120 may determine the motion vector to be valid when the length of the motion vector is longer than a predetermined length (e.g., 10 mm to 20 mm).

As still another example, the instruction vector management unit 120 may determine the motion vector to be valid when the speed of the motion vector is equal to or larger than a predetermined speed (e.g., 10 mm/sec to 20 mm/sec).

Figure 7:
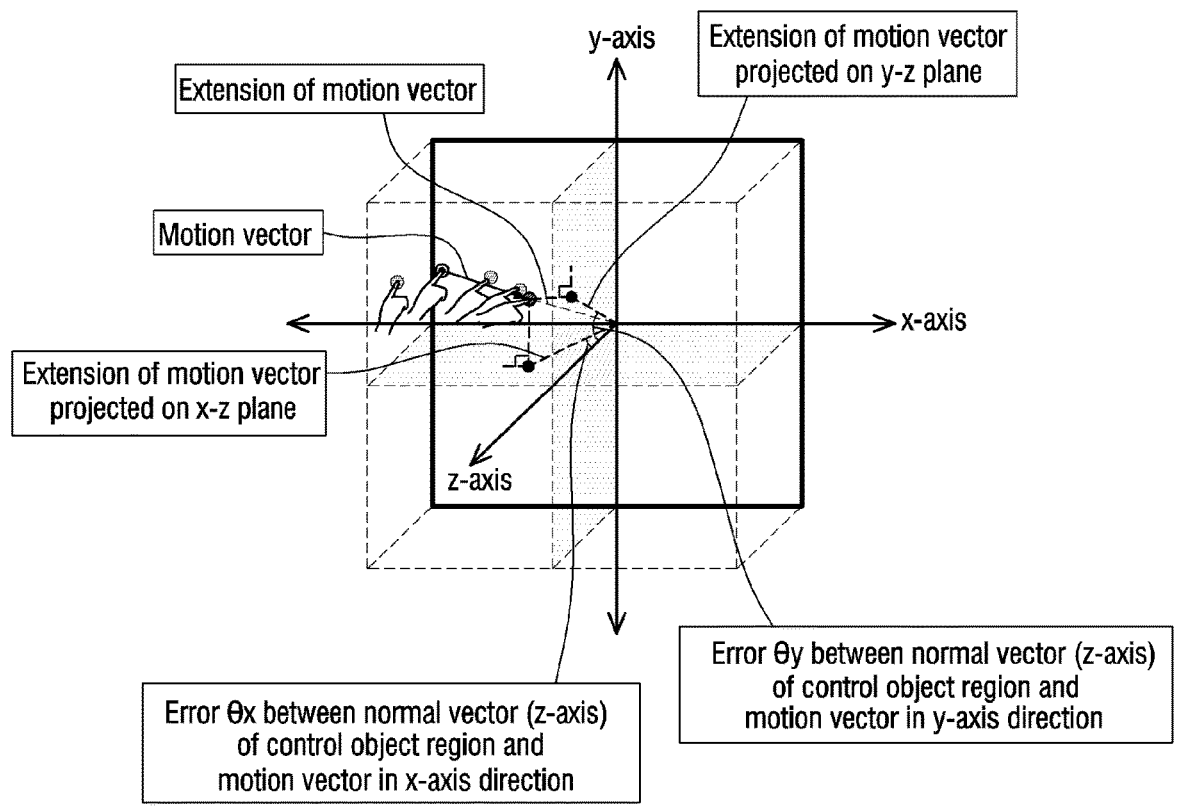
FIG. 7 illustratively shows a process of assisting object control to a user, according to one embodiment of the present disclosure.
Figure 8:
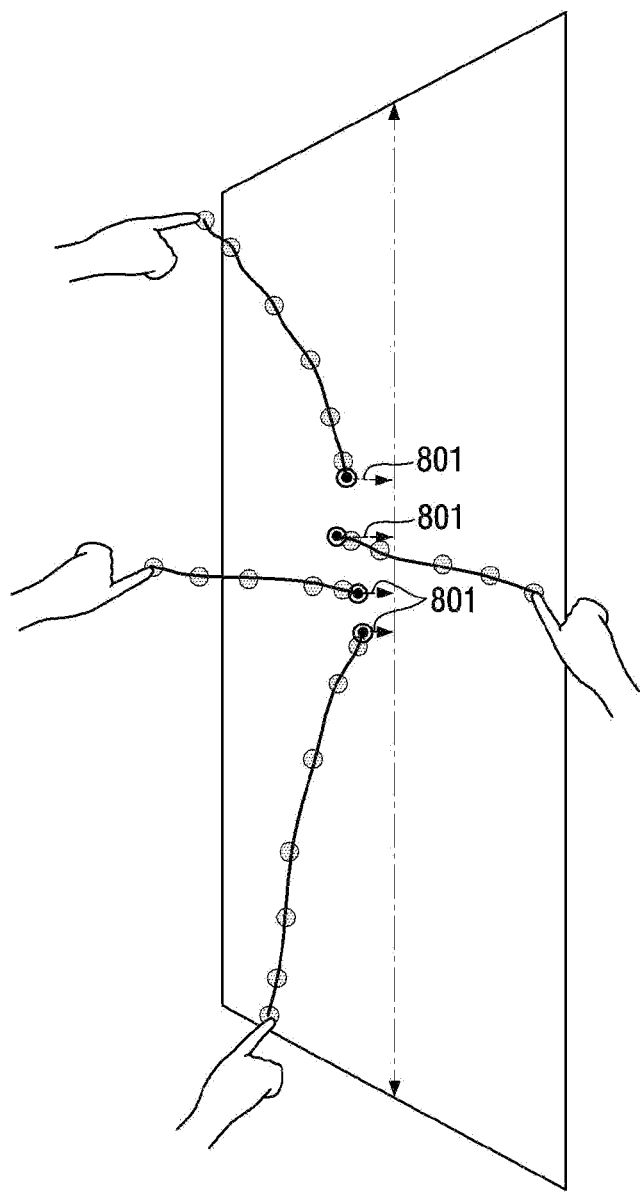
FIG. 8 illustratively shows a process of assisting object control to a user, according to one embodiment of the present disclosure.

As still another example, as shown in FIG. 7, the instruction vector management unit 120 may determine the motion vector to be valid when an angle between the motion vector and the control object region (specifically, an angle formed by a normal vector of the control object region) falls within a predetermined range (e.g., 45 degrees<$\theta x$<45 degrees, and 30 degrees<$\theta y$<60 degrees).

As yet still another example, the instruction vector management unit 120 may determine the motion vector to be valid when the aforementioned first coordinate (i.e., the end point of the motion vector) exists within a predetermined distance (e.g., 100 mm) from the control object region.

In some embodiments, when the motion vector is not specified or is invalid, the instruction vector management unit 120 may determine, as the instruction vector for determining the control position in the control object region, a vector which passes through the first coordinate or the trigger coordinate and is perpendicular to the control object region.

As an example, as shown in FIG. 7, when a trigger event in which the control means moves forward and then stops is generated and the first coordinate (or the motion coordinate of the control means) exists within a predetermined distance from the control object region, the instruction vector management unit 120 may determine a vector which passes through the first coordinate and is perpendicular to the control object region as the instruction vector for determining the control position in the control object region.

As another example, when a trigger event in which the control means moves forward and then moves backward is generated and the first coordinate (or the motion coordinate of the control means) exists within a predetermined distance from the control object region, the instruction vector management unit 120 may determine a vector which passes through the trigger coordinate and is perpendicular to the control object region as the instruction vector for determining the control position in the control object region.

In some embodiments, when a distance between the motion coordinates of the control means and the control object region is equal to or larger than a predetermined distance, the instruction vector management unit 120 may determine a vector specified based on the motion coordinates of the control means and a coordinate of the body of the user as the instruction vector for determining the control position in the control object region. The coordinate of the body of the user according to one embodiment of the present disclosure may include coordinates relating to various body portions, such as the eye(s) (e.g., dominant eye, binocular eye, or the like), head, hand(s), fingertip(s), and the like of the user. In some embodiments, when the control means is a specific body portion of the user, the instruction vector may be determined based on the specific body portion and another body portion of the user, which is different from the specific body portion.

As an example, in the case in which the control means is the fingertip of the user, when a distance between a motion coordinate of the fingertip of the user and the control object region is 8 cm or more, the instruction vector management unit 120 may determine, as the instruction vector for determining the control position in the control object region, a vector having a coordinate of the dominant eye of the user as a start point and the motion coordinate of the fingertip as an end point.

According to one embodiment of the present disclosure, the communication unit 130 may function to enable data transmission and reception from/to the coordinate management unit 110 and the instruction vector management unit 120.

According to one embodiment of the present disclosure, the control unit 140 may function to control data flow among the coordinate management unit 110, the instruction vector management unit 120, and the communication unit 130. That is, the control unit 140 according to the present disclosure may control data flow into/out of the object control assistance system 100 or data flow among the respective components of the object control assistance system 100, such that the coordinate management unit 110, the instruction vector management unit 120, and the communication unit 130 may carry out their particular functions, respectively.

Hereinafter, a situation in which the object control according to the present disclosure is assisted to the user who uses the device including the object control assistance system 100 according to one embodiment of the present disclosure, will be described. The control means in one embodiment of the present disclosure may be the fingertip (e.g., tip of the index finger) of the user.

First, the device according to one embodiment of the present disclosure may determine the first coordinate with reference to, as a trigger coordinate, a motion coordinate at a time point when a trigger event in which the fingertip moves toward the control object region and then stops is generated among motion coordinates of the fingertip of the user.

As an example, when the trigger event in which the fingertip of the user moves toward the control object region and then stops is generated, a motion coordinate (i.e., the trigger coordinate) at the time point when the trigger event is generated among the motion coordinates of the fingertip of the user may be determined as the first coordinate.

Thereafter, the second coordinate may be determined with reference to a distance between the aforementioned trigger coordinate and the motion coordinates of the fingertip of the user, and a straight line section specified by the aforementioned first coordinate and the motion coordinates of the fingertip of the user.

Specifically, one close to the aforementioned first coordinate among coordinates determined with reference to the distance between the aforementioned trigger coordinate and the motion coordinates of the fingertip of the user, and a coordinate determined with reference to the straight line section specified by the first coordinate (or the trigger coordinate) and the motion coordinates of the fingertip of the user, may be determined as the second coordinate.

Thereafter, a motion vector determined based on the first coordinate and the second coordinate described above may be determined as the instruction vector for determining the control position in the control object region.

Specifically, a motion vector specified to have the second coordinate as a start point and the first coordinate as an end point may be determined as the instruction vector.

Thereafter, the validity of the aforementioned motion vector may be verified with reference to at least one of the length, speed, direction of the motion vector determined as above and the position of the aforementioned first coordinate.

If it is determined that the motion vector is valid, a region which meets the extension of the aforementioned motion vector in the control object region may be determined as the control position intended by the user.

Figure 9:
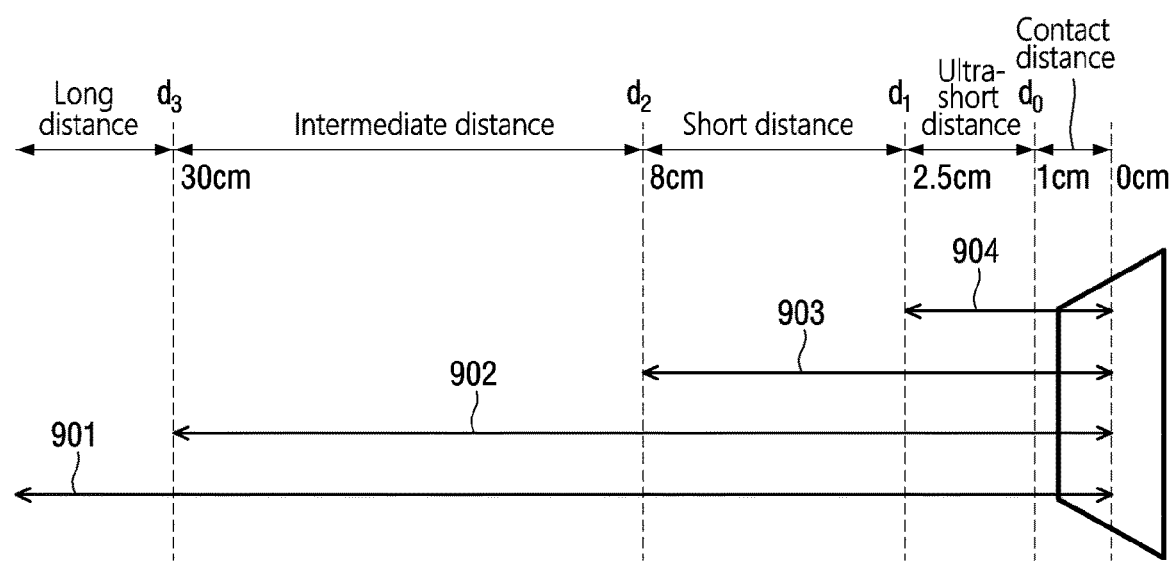
FIG. 9 illustratively shows a process of assisting object control to a user, according to one embodiment of the present disclosure.
Figure 10:
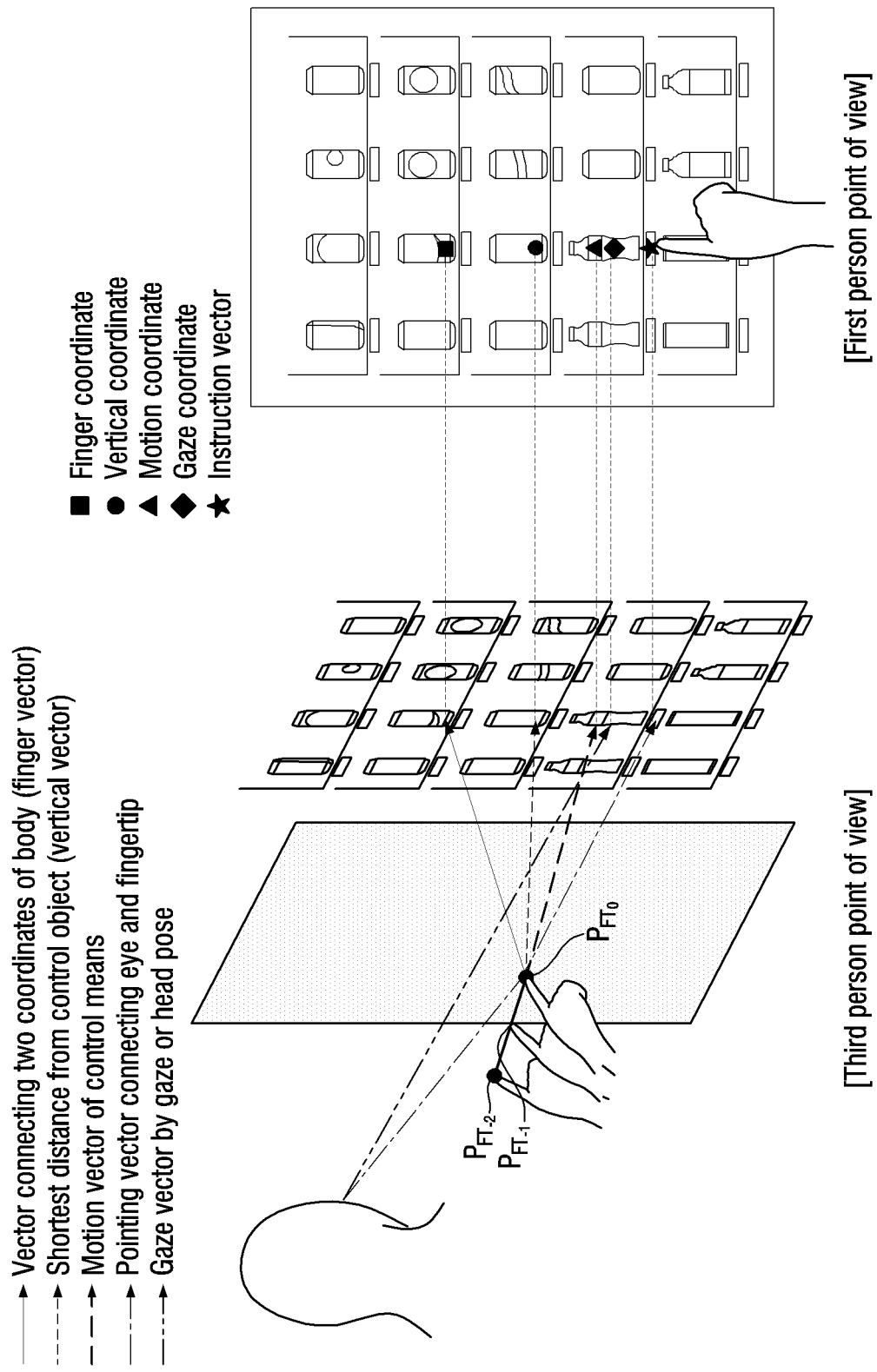
FIG. 10 illustratively shows a process of assisting object control to a user, according to one embodiment of the present disclosure.
Figure 11:
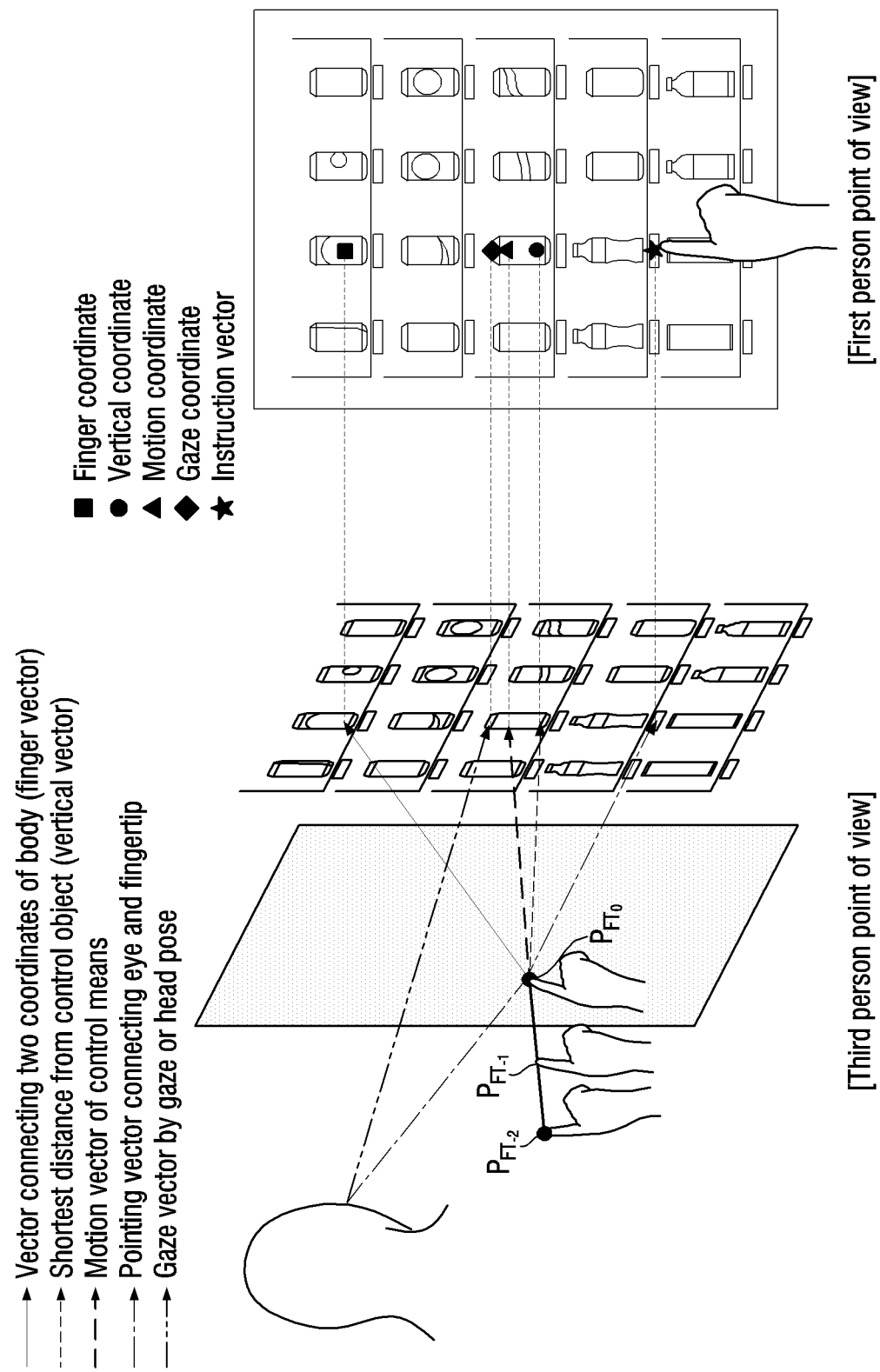
FIG. 11 illustratively shows a process of assisting object control to a user, according to one embodiment of the present disclosure.

FIGS. 9 to 11 illustratively show a process in which a control position calculation manner is dynamically changed according to one embodiment of the present disclosure.

Referring to FIG. 9, the control position may be calculated using an appropriate vector with reference to the distance between the motion coordinates of the control means and the control object region.

First, when the motion coordinates of the control means exist at a predetermined distance (e.g., 8 cm) or more from the control object region, the control position may be calculated using vectors 901 and 902 that are specified based on the motion coordinates of the control means and the body coordinate of the user. For example, when the motion coordinates of the control means exist at a first distance (e.g., 30 cm) or more from the control object region, the control position may be calculated using the vector 901 which connects the motion coordinates of the control means (e.g., the fingertip) and a coordinate of the dominant eye of the user. When the motion coordinates of the control means exist at a second distance (e.g., 8 cm) or more and at a distance less than the first distance (e.g., 30 cm) from the control object region, the control position may be calculated using the vector 902 which connects the motion coordinates of the control means (e.g., the fingertip) and a coordinate of the binocular eye (dominant eye depending on a predetermined condition) of the user.

Further, when the motion coordinates of the control means exist at a predetermined distance (e.g., 2.5 cm) or more from the control object region, the control position may be calculated using any one of the vectors 901 and 902 and a motion vector 903 specified based on the motion coordinates of the control means and the body coordinate of the user. For example, in a case in which the vectors 901 and 902, which are specified based on the motion coordinates of the control means and the body coordinate of the user, can be determined, the control position may be calculated using the vectors 901 and 902 specified based on the motion coordinates of the control means and the body coordinate of the user. Further, in a case in which the vectors 901 and 902, which are specified based on the motion coordinates of the control means and the body coordinate of the user, cannot be determined, or the vectors 901 and 902 are invalid, the control position may be calculated using the motion vector 903.

Further, when the motion coordinates of the control means exist at a distance less than a predetermined distance (e.g., 2.5 cm) from the control object region, the control position may be calculated using any one of the vectors 901, 902 and 903 specified based on the motion coordinates of the control means and the body coordinate of the user, and a vertical vector 904. For example, when the vectors 901, and 902, which are specified based on the motion coordinates of the control means and the body coordinate of the user, can be determined, the control position may be calculated using the vectors 901 and 902 specified based on the motion coordinates of the control means and the body coordinate of the user. When the vectors 901 and 902, which are specified based on the motion coordinates of the control means and the body coordinate of the user, cannot be determined or are invalid, the control position may be calculated using the motion vector 903. Further, when the vectors 901, 902 and 903, which are specified based on the motion coordinates of the control means and the body coordinate of the user, cannot be determined or are invalid, the control position may be calculated using the vertical vector 904 (e.g., a vector passing through the trigger coordinate or the first coordinate), which is perpendicular to the control object region.

In some embodiments, as shown in FIGS. 10 and 11, the validity of the motion vector may be verified using a gaze vector specified by gaze of the user or pose of the head of the user.

As an example, when an error between a first control position specified in the control object region using the motion vector according to the present disclosure and a second control position specified in the control object region using the gaze vector specified by the gaze or the pose of the head of the user is equal to or less than a predetermined level, the motion vector may be determined as a valid motion vector.

The embodiments according to the present disclosure as described above may be implemented in the form of program instructions that can be executed by various computer components, and may be stored on a non-transitory computer-readable recording medium. The non-transitory computer-readable recording medium may include program instructions, data files, and data structures, separately or in combination. The program instructions stored on the non-transitory computer-readable recording medium may be specially designed and configured for the present disclosure, or may also be known and available to those skilled in the computer software field. Examples of the non-transitory computer-readable recording medium may include: magnetic media such as hard disks, floppy disks and magnetic tapes; optical media such as compact disk-read only memory (CD-ROM) and digital versatile disks (DVDs); magneto-optical media such as floptical disks; and hardware devices such as read only memory (ROM), random access memory (RAM) and flash memory, which are specially configured to store and execute program instructions. Examples of the program instructions may include not only machine language codes created by a compiler, but also high-level language codes that can be executed by a computer using an interpreter. The above hardware devices may be changed to one or more software modules to perform the processes of the present disclosure, and vice versa.

Although the present disclosure has been described above in terms of specific items such as detailed elements as well as the limited embodiments and the drawings, they are only provided to help more general understanding of the present disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the present disclosure.

What is claimed is:

1. A method for non-contact control, comprising the steps of:
   determining a first coordinate with reference to, as a trigger coordinate, a coordinate at a time point when a trigger event relating to movement of a control means is generated, among motion coordinates of the control means;
   determining a second coordinate with reference to at least one of a straight line section specified by the trigger coordinate and the motion coordinates, and a straight line section specified by the first coordinate and the motion coordinates; and
   determining a motion vector determined based on the first coordinate and the second coordinate as an instruction vector for determining a control position in a control object region,
   wherein in the second coordinate determination step, a motion coordinate existing at the farthest distance from the first coordinate or the trigger coordinate among the motion coordinates in the straight line section specified by connecting each of the motion coordinates of the control means at other time points, which are temporally adjacent to the time point when the first coordinate is specified, with the first coordinate or the trigger coordinate, is determined as the second coordinate.

2. The method of claim 1, wherein in the first coordinate determination step, the first coordinate is determined by statistically analyzing at least one of the plurality of motion coordinates of the control means specified for a predetermined period of time starting from the time point when the trigger coordinate is specified, and the plurality of motion coordinates of the control means existing within a predetermined distance from the trigger coordinate.

3. The method of claim 2, wherein in the first coordinate determination step, at least one of the trigger coordinate and the motion coordinates existing within the predetermined distance from the trigger coordinate is excluded from a subject of the statistical analysis.

4. The method of claim 1, wherein
   the straight line section is specified in case that all the motion coordinates at the other time points temporally adjacent to the time point when the first coordinate is specified exist within a predetermined distance from straight lines which connect the first coordinate and each of the motion coordinates of the control means at the other time points.

5. The method of claim 4, wherein in the second coordinate determination step, distances between the plurality of motion coordinates of the control means existing in the straight line section fall within a predetermined range.

6. The method of claim 1, wherein in the instruction vector determination step, a validity of the motion vector is verified with reference to at least one of a length, speed and direction of the determined motion vector and a position of the first coordinate.

7. The method of claim 1, wherein in the instruction vector determination step, it is determined that the motion vector is not able to be specified when there is no motion coordinate where the distance between the trigger coordinate or the first coordinate and the motion coordinates of the control means is equal to or greater than a predetermined level.

8. The method of claim 1, wherein in the instruction vector determination step, a validity of the motion vector is verified with reference to a presence or absence of a region common to a valid region determined based on a length of the motion vector and the control object region.

9. The method of claim 1, wherein in the instruction vector determination step, when the motion vector is not specified or invalid, a vector which passes through the trigger coordinate or the first coordinate and is perpendicular to the control object region is determined as the instruction vector for determining the control position in the control object region.

10. The method of claim 1, wherein in the instruction vector determination step, when a distance between the motion coordinates of the control means and the control object region is equal to or greater than a predetermined level, a vector specified based on the motion coordinates of the control means and a body coordinate of a user is determined as the instruction vector for determining the control position in the control object region.

11. A non-transitory computer-readable recording medium having stored thereon a computer program for executing the method of claim 1.

12. A method of assisting an object control, comprising the steps of:
   determining a first coordinate with reference to, as a trigger coordinate, a coordinate at a time point when a trigger event relating to movement of a control means is generated, among motion coordinates of the control means;
   determining a second coordinate with reference to at least one of a straight line section specified by the trigger coordinate and the motion coordinates, and a straight line section specified by the first coordinate and the motion coordinates; and
   determining a motion vector determined based on the first coordinate and the second coordinate as an instruction vector for determining a control position in a control object region,
   wherein in the second coordinate determination step, a coordinate closest to the first coordinate, among a coordinate determined with reference to the distance between the trigger coordinate and the motion coordinates of the control means and a coordinate determined with reference to the straight line section specified by the first coordinate and the motion coordinates of the control means, is determined as the second coordinate.

13. A system for non-contact control, comprising:
   a coordinate management unit configured to determine a first coordinate with reference to, as a trigger coordinate, a coordinate at a time point when a trigger event relating to movement of a control means is generated, among motion coordinates of the control means, and configured to determine a second coordinate with reference to at least one of a straight line section specified by the trigger coordinate and the motion coordinates, and a straight line section specified by the first coordinate and the motion coordinates; and
   an instruction vector management unit configured to determine a motion vector determined based on the first coordinate and the second coordinate as an instruction vector for determining a control position in a control object region,
   wherein the coordinate management unit is configured to determine a motion coordinate existing at the farthest distance from the first coordinate or the trigger coordinate among the motion coordinates in the straight line section specified by connecting each of the motion coordinates of the control means at other time points, which are temporally adjacent to the time point when the first coordinate is specified, with the first coordinate or the trigger coordinate, as the second coordinate.

* * * * *